United States Patent [19]
Vallee

[11] Patent Number: 5,901,435
[45] Date of Patent: May 11, 1999

[54] DEVICE FOR INSTALLING AERIAL BEACONS ON A CABLE

[75] Inventor: Patrick Vallee, Cadenet, France

[73] Assignee: Electricite De France Service National, Paris, France

[21] Appl. No.: 08/725,622

[22] Filed: Oct. 3, 1996

[30] Foreign Application Priority Data

Oct. 18, 1995 [FR] France .................................. 95 12222

[51] Int. Cl.[6] .................................................. B23Q 7/10
[52] U.S. Cl. .......................... 29/809; 29/281.5; 29/281.6
[58] Field of Search ............................ 29/463, 700, 809, 29/281.5, 281.6

[56] References Cited

U.S. PATENT DOCUMENTS

| | | | |
|---|---|---|---|
| 3,430,325 | 3/1969 | Lematta | 29/463 X |
| 4,589,175 | 5/1986 | Arrigoni | 29/156.8 B |
| 4,638,602 | 1/1987 | Cavalieri | 51/217 R |
| 4,805,351 | 2/1989 | Dobson et al. | 51/217 R |
| 4,829,720 | 5/1989 | Cavalieri | 51/217 R |
| 4,885,835 | 12/1989 | Osgood | 29/463 |
| 5,038,465 | 8/1991 | Jans | 29/463 X |
| 5,230,183 | 7/1993 | Wagner, Jr. | 51/217 R |
| 5,425,328 | 6/1995 | Larumbe . | |

FOREIGN PATENT DOCUMENTS

| | | |
|---|---|---|
| 468368 | 1/1992 | European Pat. Off. . |
| 573382 | 12/1993 | European Pat. Off. . |
| 2569312 | 2/1986 | France . |
| 2577078 | 8/1986 | France . |

*Primary Examiner*—Joseph M. Gorski
*Attorney, Agent, or Firm*—Pearne, Gordon, McCoy & Granger LLP

[57] ABSTRACT

This invention pertains to a device for the automatic installation of aerial beacons on a cable. The device has magazines for the distribution of half-beacons (12a, 12b) and means (16) for putting into place and assembly on the cable of half-beacons (14) respectively distributed by the magazines in order to form the beacons. Accordingly to the invention, the device incorporates attachment means (20, 22) for suspending on the cable (18) and for moving along a cable in a movement direction (X), the means (16) for putting into place and assembly being placed on the device so as to install the beacons behind the attachment means with respect to the movement direction.

20 Claims, 6 Drawing Sheets

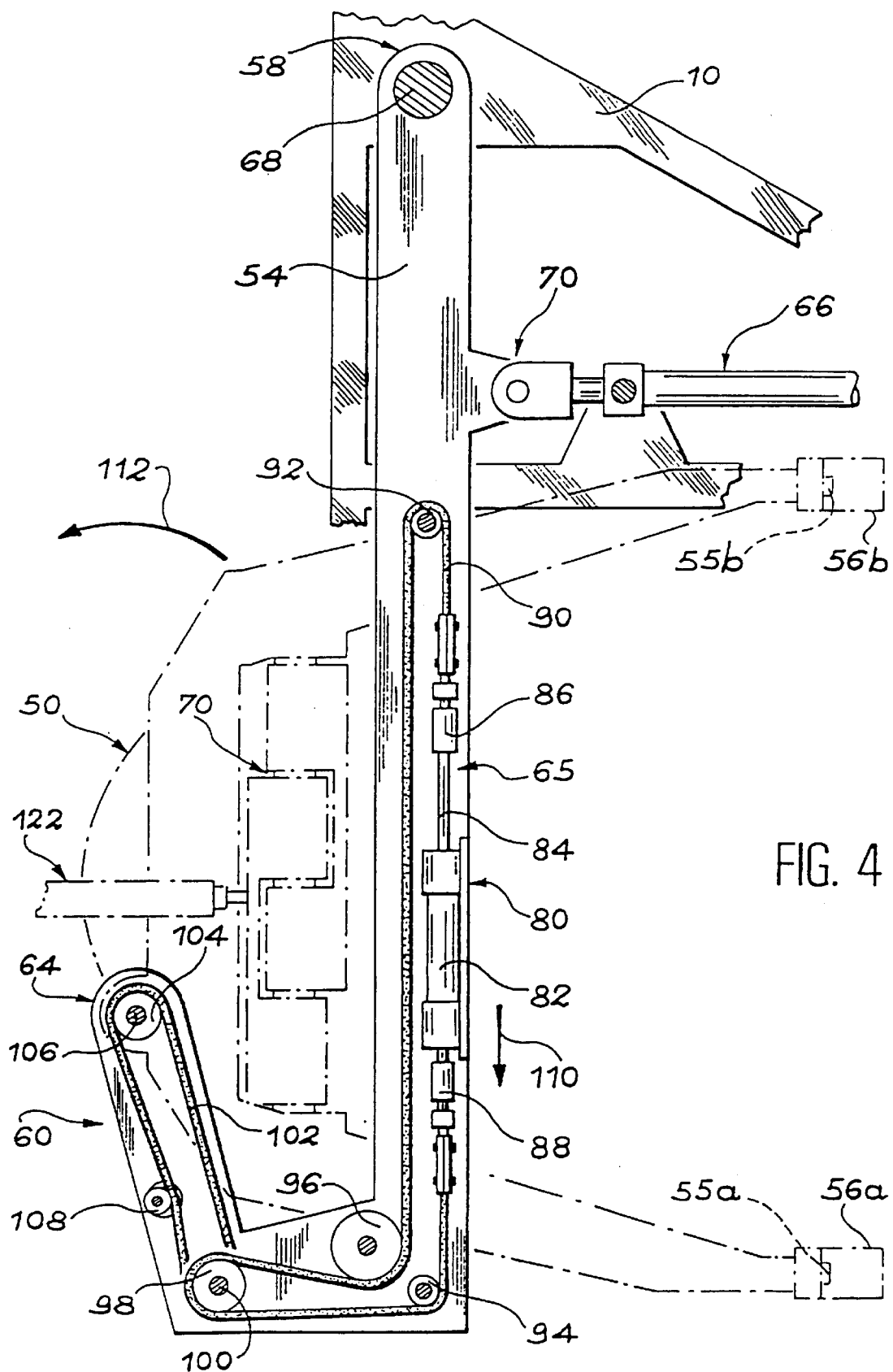

DEVICE FOR INSTALLING AERIAL BEACONS ON A CABLE

TECHNICAL FIELD

The present invention relates to a device for the automatic installation of aerial beacons on a cable. Such beacons are in particular installed on electric cables and serve to indicate the presence of said cables to air-craft pilots, particularly in the vicinity of airfields.

PRIOR ART

Aerial cable beacons are generally in the form of two hemispherical half-beacons, also known as shells and which are fixed to one another by screwing on the cable. Reference can be made in this connection to FR-A-2 569 312. These half-beacons can be assembled manually and installed on a cable. There is also a type of beacon with closure by clips. For example, EP-A-468 368 discloses a device for the automatic installations of such clip-based beacons. This device is positioned on a cable, whilst being suspended from a helicopter. It has a pair of magazines, each containing hemispherical half-beacons. An installation mechanism is provided for extracting respectively from each magazine a half-beacon and for fixing said half-beacons together on the cable. This known type of device facilitates the task of placing beacons on a cable. However, the manipulation of the device is complex and the installation operation difficult.

Thus, following the installation of a beacon, the device must be removed from its location on the cable in order to be positioned at a following location for the installation of the next beacon.

The successive removal and positioning of the device on the cable is long and difficult, due to the fact that the device is suspended on a helicopter. The continuous use of the helicopter also leads to high costs for the beacon installation operation.

Lateral positioning guides can be provided for facilitating the putting into place of the device above the cable. However, the guidance of the device along the cable remains relatively inaccurate, which complicates the equi-distant arrangement of the beacons along the cable.

The object of the present invention is to propose a novel type of device for installation beacons and which makes it possible to overcome the difficulties referred to hereinbefore.

Another object is to propose an autonomous device not requiring a continuous intervention of a helicopter for installing the successive beacons.

Another object of the invention is to propose a device for the equi-distantly distributed distribution of beacons along a cable.

Yet another object is to propose a device for installing beacons on a cable, which is particularly reliable and easy to put into place on the cable.

The invention also aims to propose a process for putting the beacons into place on a cable.

DESCRIPTION OF THE INVENTION

In order to achieve the above objects, the invention more particularly relates to a device for the automatic installation of aerial beacons on a cable, comprising at least one pair of half-beacon distribution magazines, means for putting place and assembling on the cable of half-beacons respectively distributed by the distribution magazines in order to form beacons, characterized in that the device incorporates attachment and movement means for suspension on the cable and for moving along the cable in a movement direction, the means for putting into place and assembling the half-beacons being located on the device in such a way as to install the beacons behind the attachment means of the device on the cable with respect to the movement direction.

As a result of the attachment and movement means, the positioning of the device with respect to the cable for putting the beacons into place is automatically ensured when the device is suspended on the cable.

Moreover, when the device is suspended on the cable, it is merely necessary to move it along the cable by a constant distance between the installation of two successive beacons in order to obtain an equidistant distribution of the latter on the cable. It should be noted in this connection that a movement along the cable can be carried out with an accuracy much greater than that of the positioning on a cable of a device suspended on a helicopter.

Moreover, according to an advantageous aspect of the invention, the device can be equipped with motor means for its automatic movement along the cable.

As the device is suspended on the cable, it is automatically positioned with respect thereto. However, the device can be improved in order to take account of the angle existing between a movement axis of the device and the cable to the rear of the device, in the region where the beacons are installed. This angle can vary slightly as a function of parameters such as the tension of the cable, the weight of the device and the position of the device on the cable. Thus, according to another aspect of the invention, the means for putting into place and assembling the half-beacons incorporate a positioning guide for said half-beacons with respect to the cable prior to their assembly.

According to an embodiment of the device, the means for putting into place and assembling the half-beacons comprise:

- at least one installation mechanism incorporating the positioning guide and a pair of gripping heads for the half-beacons distributed by the distribution magazines,
- at least one movement mechanism for moving the installation mechanism between the magazines and the cable, the installation mechanism being fitted so as to pivot on the movement mechanism in order to orient the positioning guide towards the cable, whilst the installation mechanism also has mutual articulation means for the gripping heads in order to make them pivot from a so-called open position of gripping the half-beacons to a so-called closed position of assembling the half-beacons on the cable, in which the assembly sides respectively of each half-beacon are mutually in contact.

As described in greater detail hereinafter, the pivoting mechanism can also cooperate with the positioning guide in order to pivot the installation mechanism and accurately adjust its position with respect to the cable, whilst taking account of the angle formed by the cable and the movement axis.

To this end, the positioning guide can have a pair of forks in a plane substantially perpendicular to the rotation axis of the installation mechanism with respect to the movement mechanism and containing an axis defined by the articulation means.

The forks are e.g. located on fork arms, respectively on either side of the gripping heads.

According to a particular embodiment of the device according to the invention, the latter has a chassis including attachment means. The attachment means can have at least two suspension hooks for the device respectively fixed at the front and rear of the chassis, the hooks defining the movement axis of the device on the cable and the distribution magazines are positioned side by side in the chassis, substantially parallel to the movement axis, each of the magazines having a half-beacon distribution opening oriented towards the rear of the device with respect to the movement direction.

In such a device, the displacement mechanism can incorporate at least one pivoting arm having a first end with a first articulation or joint connected to the chassis, said first joint having a pivoting axis substantially perpendicular to a median plane of the half-beacon distribution magazines, and containing the movement axis, the movement mechanism also having a jack mounted between the chassis and the pivoting arm in order to pivot the arm about the first axis between a low position in which the installation mechanism is positioned behind the magazine distribution openings and a high position in which said installation mechanism is positioned behind the suspension hooks.

Moreover, the movement arm can have a second end with a second joint along a pivoting axis substantially parallel to the pivoting axis of the first joint, the second joint carrying the installation mechanism, the device having an actuating means for pivoting the installation mechanism about the pivoting axis of the second joint between a first position in which the gripping heads are in the open position and turned facing the magazine distribution openings, when the movement arm is in the low position, and a second position in which the gripping heads are turned facing the cable, when the movement arm is in the high position.

For the assembly of the half-beacons, at least one of the gripping heads can have means for manipulating fixing members, such as screw-nut assemblies carried by the half-beacons. To control the operation of the device, the latter can e.g. have a central control unit.

From a neutral position in which the arm is in the low position and the installation mechanism in the first position, said unit is able to successively control:

the actuation of a gripping system of each gripping head in order to seize a half-beacon in each magazine, the actuation of the jack of the pivoting arm and actuating means for pivoting the arm towards the high position and for pivoting the installation mechanism to the second position, the actuation of the installation mechanism for pivoting the gripping heads from the open position to the closed position, the actuation of the means for manipulating the fixing members for the beacons, the actuation of the gripping system of each gripping head for releasing the half-beacons, the actuation of the installation mechanism for pivoting the gripping heads from the closed position to the open position, the actuation of the jack of the pivoting arm and actuating means for respectively pivoting the arm to the low position and for pivoting the installation mechanism to the first position.

The central control unit can be programmed for the installation of a predetermined number of beacons.

The invention also relates to a process for the installation of aerial beacons using a device like that described hereinbefore.

According to the invention, the process involves the following stages:

gripping by gripping heads of two half-beacons supplied by the distribution magazines, actuation of the movement mechanism for moving the installation mechanism from the magazines to the cable, actuation of the installation mechanism for orienting the positioning guide towards the cable, actuation of the installation mechanism for pivoting the gripping heads to the closed position when the positioning guide is in contact with the cable, actuation of the manipulating means of the fixing members carried by the half-beacons in order to join together the said half-beacons and fix them to the cable.

According to an improved implementation of the process, the actuation of the pivoting arm and the actuation of the installation mechanism for orienting the positioning guide can in part be concomitant.

According to another improvement, the actuation of the installation mechanism for the orientation of the guide is interrupted and the installation mechanism pivots freely when at least one of the forks of the positioning guide bears against the cable and in that the actuation of the pivoting mechanism is interrupted when the two forks of the pair of forks bear against the cable.

Other features and advantages of the present invention can be better gathered from the following description with respect to the attached drawings and given in a purely illustrative and non-limitative manner.

BRIEF DESCRIPTION OF THE DRAWINGS

FIG. 4 is a larger scale view of a pivoting arm for the movement of the installation mechanism of the device of the present invention.

DETAILED DESCRIPTION OF EMBODIMENTS OF THE INVENTION

Figure 1:
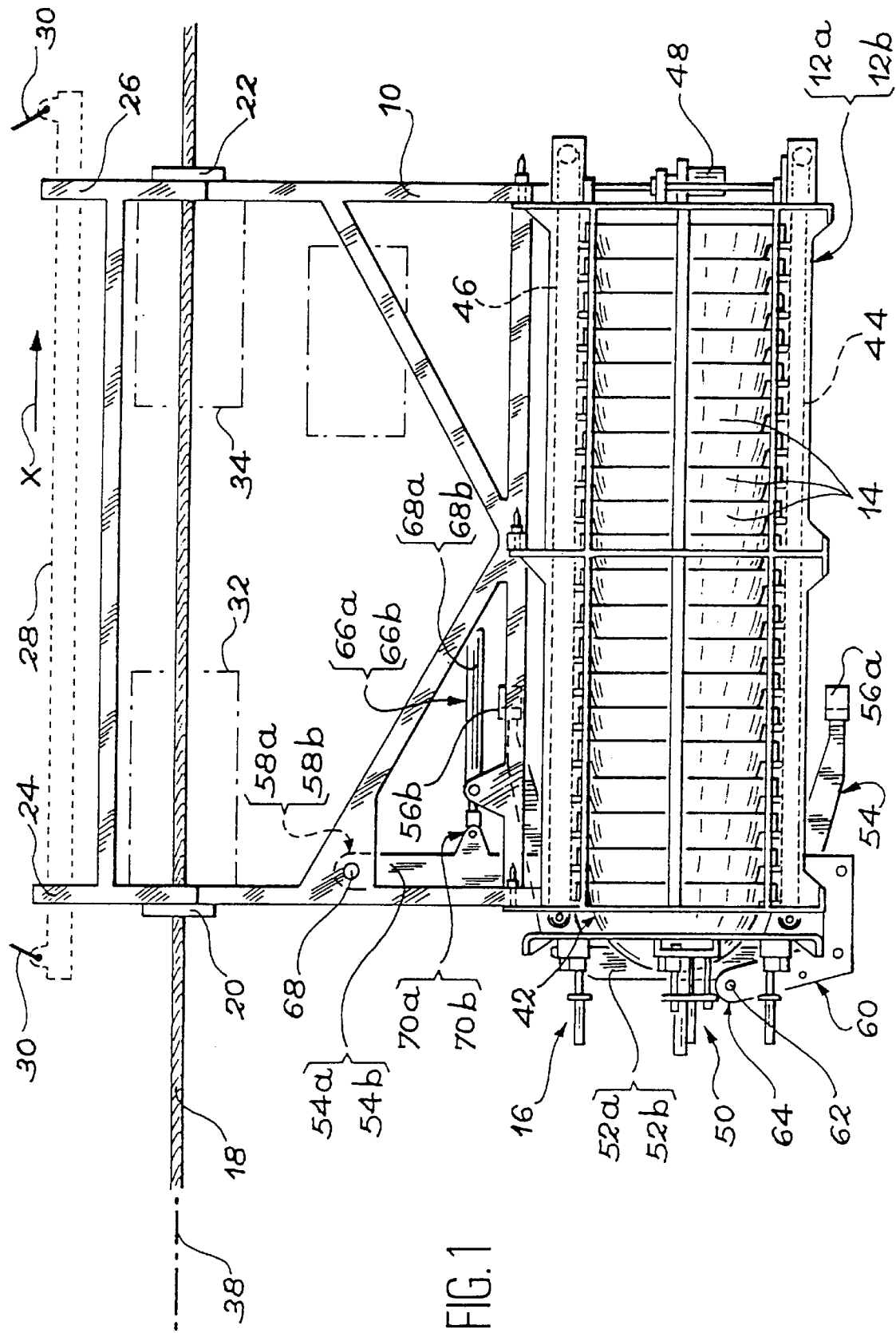
FIG. 1 is a simplified side view of an aerial beacon installation device according to the invention.

As shown in FIG. 1, the device according to the invention has, in the illustrated embodiment, a chassis 10, a pair of distribution magazines 12a, 12b for half-beacons 14 detachably mounted in the chassis 10 and means 16 for the putting into place and assembly of half-beacons on a cable 18.

In its upper part, the device also has attachment and movement means for suspension on the cable 18. They e.g. comprise two hooks 20, 22 respectively fixed at the front and rear of the chassis 10 and roller-based movement motor means 32, 34. The attachment means 20, 22, 32, 34 not only have the function of suspending the device on the cable 18, but also of permitting its movement or displacement along the cable in a direction X indicated by an arrow.

The terms front and rear of the device must be understood with respect to the movement direction X of the device on the cable. Thus, the front and rear of the device respectively correspond to the right-hand part and left-hand part of the drawing.

The device also has hooks 24, 26 also fixed to the front and rear of the chassis 10 to permit its lifting from the ground and for transporting it to the cable 18 for suspension there.

The device can be lifted by means of a bar 28, suspended on a not shown helicopter, by cables 30 and which engage in the hooks 24, 26.

The hooks 20, 22 for suspending the device on the cable and the hooks 24, 26 for lifting the device from the ground and attaching it to the cable, are also visible in FIG. 2 and are described in greater detail hereinafter.

The motor means 32, 34, e.g. equipped with not shown drive rollers or pulleys and engaging on the cable 18, are provided in the upper part of the device in order to permit its autonomous movement on the cable 18.

Thus, the bar 28, shown in broken line form in FIG. 1, can be removed from the device as soon as the latter is suspended on the cable. The movement between an installation position of one beacon to the next can be remotely controlled, e.g. by actuating the motor means 32, 34.

The magazines 12a, 12b juxtaposed in the chassis, in a position below the hooks 20, 22, 24, 26 are oriented substantially to an axis 38, called the movement axis, passing through the hooks 20, 22 for suspending the device on the cable 18. In the case of FIG. 2, the movement axis 38 coincides with the cable portion 18 shown.

Each magazine 12a, 12b has a plurality of half-beacons 14, in the form of stacked shells, which can e.g. be made from plastic.

The shells are put into place in the magazines by orienting their hemispherical portion towards the outlet from the magazines, i.e. towards a shell distribution opening 42. When the loaded magazines are in place in the chassis, their openings 42 are turned to the rear, i.e. towards the beacon installing means 16.

Drive belts 44, 46 moved by a motor 48 are located on either side of each magazine in order to drive the half-beacons towards the opening 42, where they are delivered one by one to the means 16 for putting into place and assembling the half-beacons on the cable.

In the case of the present invention, the device only has a single pair of interchangeable half-beacon distribution magazines. However, it is possible to envisage a device having a plurality of such magazines.

The means 16 for putting into place and assembling the half-beacons on the cable incorporate an installation mechanism 50 shown in a rear position for the simultaneous gripping of two half-beacons, respectively in each magazine 12a, 12b. For this purpose the installation mechanism has two heads 52a, 52b for gripping the half-beacons not shown in detail in this drawing.

The installation mechanism 50 is connected to the chassis 10 of the device by a movement mechanism having a pair of pivoting arms 54a, 54b. Each arm of the pair has a first end fixed to the chassis 10 by means respectively of an articulation or joint 58a, 58b. A second end 60, common to the two arms 54a, 54b, is in crosshead form.

The installation mechanism is installed so as to pivot about a pivot pin 62 of a joint 64 connecting it to the crosshead 60.

A positioning guide for the installation mechanism with respect to the cable has two forks 56a, 56b located in a median plane of the installation mechanism and substantially perpendicular to the pivot pin 62. The forks 56a, 56b are fixed to the installation mechanism on either side of the gripping heads 52a, 52b for fork arms.

Moreover, jacks 66a, 66b are provided for pivoting the pair of arms 54a, 54b about a pin 68 of the joints 58a, 58b. The jacks 66a, 66b respectively have a jack body 68a, 68b mounted so as to pivot on the chassis 10 and a jack rod mounted on a clevis 70a, 70b of each arm 54a, 54b.

Reference numeral 61 in FIG. 1 designates a central control unit for coordinating the movements of the members for putting into place and assembling the beacons. The unit 61 e.g. has a software for the performance of the movements, but can also be equipped with remote control means for remotely controlling certain operations through an operator. The unit 61 in particular makes it possible to control the operation of the jacks 66a, 66b for pivoting the arms 54a, 56b and e.g. the operation of the motor means 32, 34 for the autonomous movement of the device on the cable.

The unit 61 can in particular be programmed for controlling a predetermined movement of the device along the cable following the installation of each beacon, so as to obtain a substantially equidistant distribution of the beacons on the cable. The unit 61 can also be programmed for the installation of a predetermined number of beacons following the suspension of the device on the cable.

Figure 2:
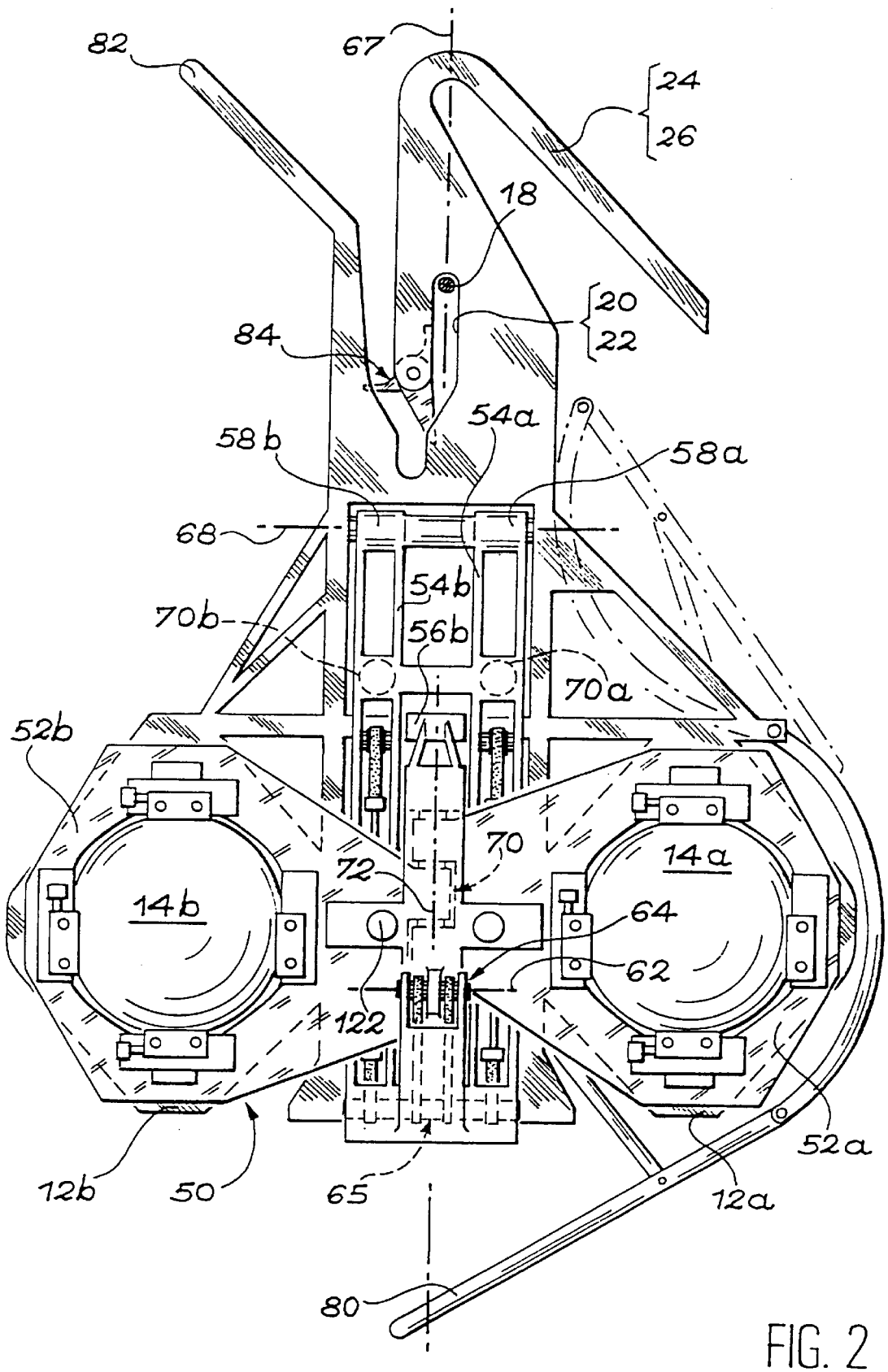
FIG. 2 is a simplified rear view of the device of FIG. 1.

FIG. 2 is a rear view of the device of FIG. 1 more clearly showing the two arms 54a, 54b of the pair of arms, their first ends 56a, 56b, the joints 58a, 58b around the pivot pin 68, the crosshead 60 forming a second common end for the arms 54a, 54b and the joint 64 around the pivot pin 62.

Reference numeral 65 designates in general terms the actuating means on the arms 54a, 54b for pivoting the installation mechanism 50 around the pivot pin 62. Means 65 will be described in greater detail hereinafter.

FIG. 2 also shows the two gripping heads 52a, 52b of the half-beacons respectively positioned in front of the distribution openings of the magazines 12a, 12b and respectively seizing half-beacons 14a, 14b. The gripping heads and magazines are arranged symmetrically with respect to a median plane 67 containing the movement axis through which passes the suspension cable 18. The pins or axes 62 and 68 are substantially perpendicular to said plane 67.

As shown in FIG. 2, the installation mechanism has an articulation or joint 70 with a pin 72 located in the plane 67 and around which can mutually pivot the gripping heads 52a and 52b.

The heads in particular can pivot from a so-called open position, as shown in FIG. 2 and in which the assembly sides of the half-beacons, held by the heads, are substantially located in the same plane, to a so-called closed position described hereinafter.

Guides 80, positioned to the front and rear of the chassis, laterally surround one of the sides of the device in order to guide the lifting bar (not shown in FIG. 2), suspended on a helicopter, towards hooks 24, 26 for putting into place the said device on the cable 18. The guides 80 also prevent any impact between a lifting bar and the members of the device.

The guides 80 can be brought from an extended position indicated in continuous line form in the drawing to a position indicated in mixed line form.

Moreover, guides 82 in the top portion of the chassis permit the guidance of the cable 18 towards the hooks 20, 22 in order to attach there the beacon installation device.

A safety bolt system 84 is provided in the lower portion of the hooks 20, 22 in order to prevent any risk of an accidental detachment of the device.

FIGS. 3A to 3D diagrammatically illustrate the installation of a beacon on a cable 18. They show in simplified form the chassis 10, a distribution magazine 12a for the half-beacons 14, the suspension hooks 20, 22 and the essential elements of the means 16 for putting into place and assembling the half-beacons. In particular, the drawings show the installation mechanism 50 with the gripping heads 52a, 52b for the half-beacons, the positioning guide forks 56a, 56b and the movement mechanism.

In the remainder of the description, reference is made to a single pivoting arm 54 of the movement mechanism, whereas in practice the device can have one, a pair or a plurality of such pivoting arms, all of the arms describing the same movement.

The installation of a beacon on the cable starts with the gripping of the half-beacons 14 on leaving the magazines. During this operation the movement arm 54 is in the already described low position shown in FIG. 2. In this position, the installation mechanism is positioned in front of the magazine distribution openings and oriented in such a way that the gripping heads are turned facing the distribution openings in order to seize the half-beacons. A fictional axis passing through the positioning guide forks is then substantially perpendicular to the axis of the cable 38. This position of the arm and the installation mechanism is called the neutral position of the half-beacon installation means.

Figure 3A:
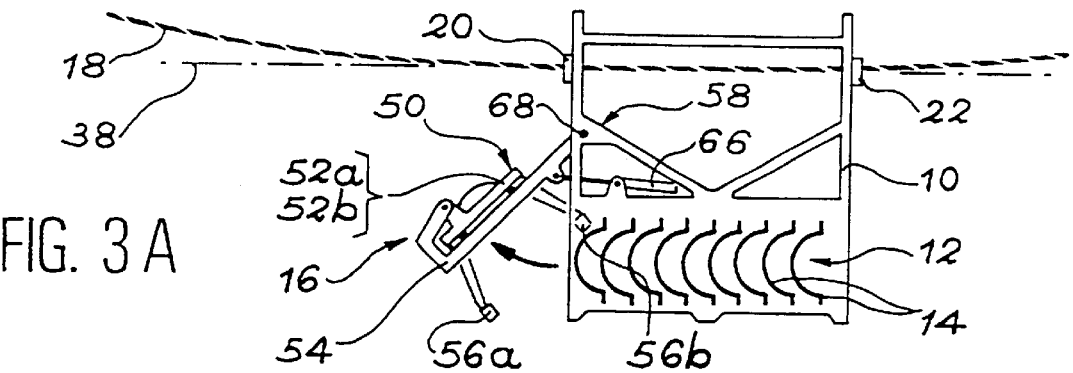
FIGS. 3A, 3B and 3C are simplified, smaller scale, diagrammatic views of the device according to the invention, illustrating the installation of a beacon on the cable.

When each gripping head is equipped with a half-beacon, the jack 66 is actuated to bring about a rearward pivoting of the arm 54 about the pin 68 of the joint 58, as shown in FIG. 3A.

Simultaneously or not, actuating means, which are not shown in FIGS. 3A to 3D, are put into service in order to bring about the rearward pivoting of the installation mechanism 50 about the pin 62 of the joint 64.

Figure 3B:
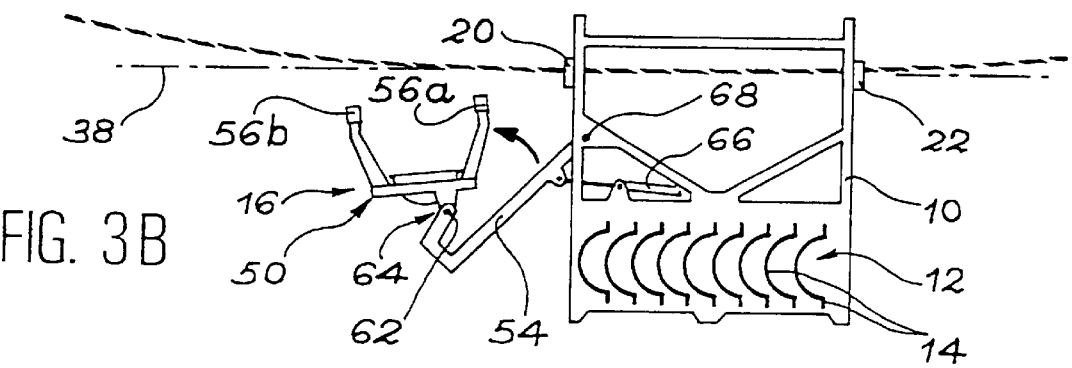

As shown in FIG. 3B, the pivoting of the installation mechanism 50 around the pin 62 permits the orientation of the positioning guide 56a, 56b towards the cable and therefore turns the gripping heads facing the cable. When the gripping heads face the cable, the assembly sides of the half-beacons are also turned facing the cable. The fictional plane containing the assembly sides of the half-beacons, substantially perpendicular to the plane 67 visible in FIG. 2, is then substantially parallel to the movement axis 38.

Figure 3C:
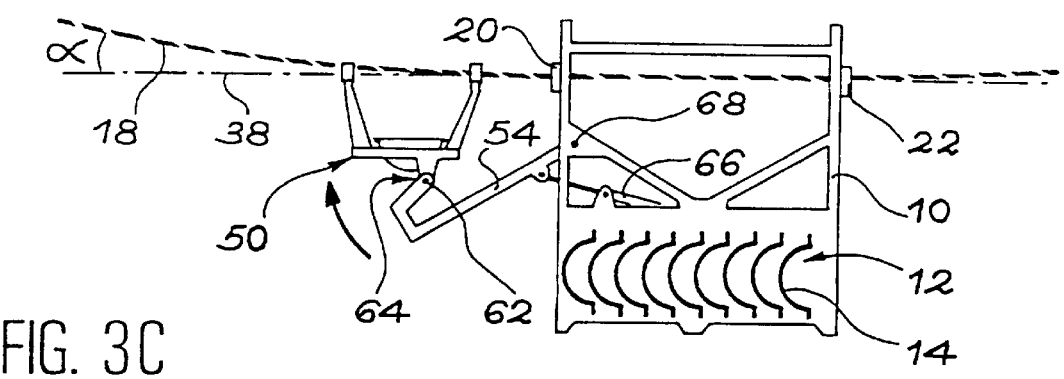

FIG. 3C shows the function of the positioning guide. As can be gathered, the suspension cable 18 is not perfectly parallel to the displacement axis 38. Thus, under the effect of the sag of a cable between the support pylons, accentuated by the suspended weight of the device, the cable 18 forms to the rear and front of the device a small angle α (FIG. 3C) with the axis 38. This angle has been deliberately exaggerated for reasons of clarity.

As a result of the angle α, which can vary as a function of the position of the device along the cable, it is not possible to accurately program the extent of the pivoting of the arm 54 about the pin 68 and the extent of the pivoting of the installation mechanism 50 about the pin 62 in order to accurately position the installation mechanism with respect to the cable.

Thus, advantageously, the operation of the actuating means for pivoting the installation mechanism is interrupted when, as shown in FIG. 3C, one of the forks of the positioning guide 56a bears against the cable 18. At this moment, the joint 64 about the pin 62 is rendered free in order to authorize the free pivoting of the installation mechanism about said axis. Continuing to pivot the arm 54 about the axis 68, the second fork 56b is also positioned against the cable 18. When this position is reached, the arm is in its so-called high position and the operation of the jack 66 is also interrupted.

Figure 3D:
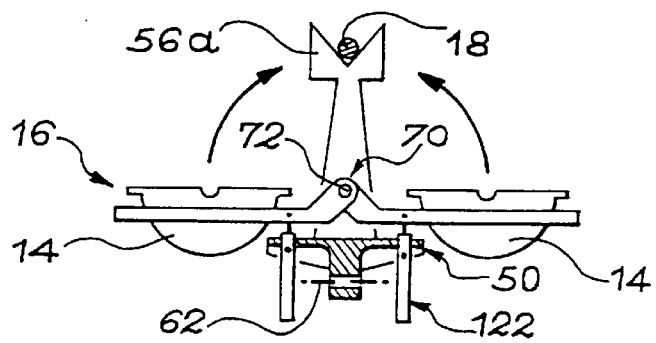
FIG. 3D is a simplified, diagrammatic view of the beacon installation mechanism of the device of FIGS. 3A, 3B and 3C.

In the high position, as shown in FIG. 3D, the installation mechanism 50 is positioned in front of the cable 18 and is kept at a predetermined, fixed distance by the length of the fork arms of the positioning guide.

The gripping heads equipped with the half-beacons then perfectly face the cable 18 and can be pivoted about the axis 72 of the joint 70, as indicated by the arrows in FIG. 3D. The pivoting of the gripping heads and the mutual assembly of the beacons is described hereinafter relative to FIGS. 5 and 6.

FIG. 4 provides a better understanding of the arrangement of the motor means 65 for pivoting the installation mechanism around the pin 62.

FIG. 4 shows the movement arm 54. The following description is given with respect to the single arm 54 shown in FIG. 4 but, as is in particular shown in FIG. 2, the device can be equipped with two or more such arms.

The arm has a first end with a first joint 58 connected to the chassis 10 and a second, crosshead-shaped end, with a second joint 64 receiving the installation mechanism 50 shown in mixed line form.

As is visible in FIG. 4, the actuating means 65 have, for each arm, a jack 80, with a jack body 82, fixed to the arm 54 and a jack rod 84, whose ends 86, 88 are respectively connected to a belt 90. The belt passing over guide pulleys 92, 94, 96 makes it possible to rotate a pulley 98 mounted on a shaft 100, when the jack rod is moved in accordance with its axis.

A second belt 102, passing over a not visible pulley and integral in rotation with the shaft 100, permits the transfer of the rotary movement of the shaft 100 to a pulley 104 fixed to a drive shaft 106 for the installation mechanism. The belt 102 is kept taut by a tensioning pulley 108.

Thus, by actuating the jack 80, a movement of the jack rod 84 in the direction of the arrow 110 rotates the shaft 100 away from the shaft 106 and brings about the pivoting of the installation mechanism 50 on the joint 64 in the direction of the arrow 112.

A disengagement system, not visible in the drawing, controlled by the central control unit permits the linking of the chambers of the jack in order to render free the pivoting of the mechanism 50 on the joint 64, when at least one of the forks 56a, 56b bears against the cable. To this end, a mechanical contact detector 55a, 55b connected to the central control unit 61 can be provided respectively in each fork 56a, 56b.

Figure 5:
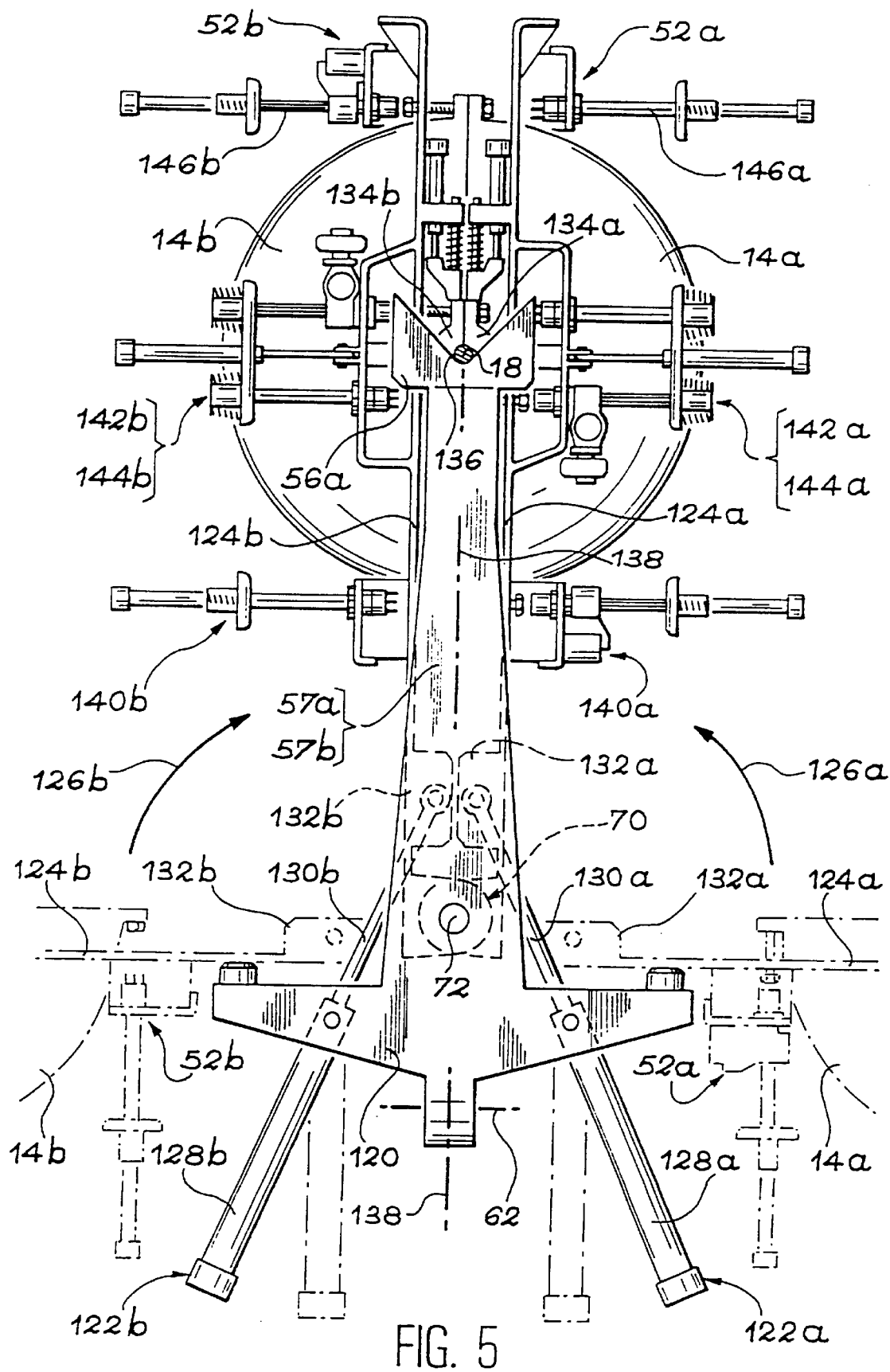
FIG. 5 is a more detailed view on a larger scale of the installation mechanism.

FIG. 5 shows in greater detail the construction of the installation mechanism and illustrates the assembly of the half-beacons on the cable.

The installation mechanism has a frame 120 pivoting on the not shown movement arm about the pin 62. The frame supports the joint 70 about which can pivot the gripping heads between a so-called open position, as shown in FIG. 3D, and as sketched in mixed line form in FIG. 5, and a so-called closed position shown in continuous line form. In the open position, the assembly sides of the half-beacons are located in a plane substantially perpendicular to the fork arms 57a, 57b supporting the positioning guide forks. In the closed position, the assembly sides of the half-beacons 14a, 14b are mutually in contact in a plane 138 substantially parallel to the fork arms, containing the axis or pin 72 and passing through the cable 18. The plane 138, which is the median plane of the installation mechanism, is also substantially perpendicular to the pivot pin 62.

Jacks 122a, 122b bearing on the frame 120 and controlled by the central control unit (visible in FIG. 1) permit the actuation of arms 124a, 124b of the gripping heads 52a, 52b in order to pivot them in accordance with the arrows 126a, 126b between the open position and the closed position. For this purpose, the jacks 122a, 122b respectively have a jack body 128a, 128b mounted on the frame 120 with a pivoting possibility, as well as a jack rod 130a, 130b, respectively mounted on a clevis 132a, 132b of each arm. The frame 102 also carries the positioning guide, whereof the drawing shows a fork 56a supported by a fork arm 57a.

The length of the fork arms is adjusted with respect to the length of the arms 124a, 124b of the gripping heads, in such a way that a cable duct 134a, 134b of the beacons 14a, 14b respectively held by the heads 52a, 52b precisely intercepts the cable 18 bearing against the top 136 of each fork, when the gripping heads are pivoted from the open position to the closed position.

Each gripping head is equipped with fixing member manipulating means carried by the half-beacons. They are e.g. four screwing assemblies 140a, 140b, 142a, 142b, 144a, 144b, 146a, 146b cooperating with screw-nut assemblies located on the beacons. The screwing assemblies make it possible to join together the two half-beacons for forming a beacon and also permit the joining of the beacon with the cable.

Each screwing assembly incorporates a screwing rod 150 for rotating a screw and a nut holding rod 152. The screwing 150 and holding 152 rods are arranged in such a way that, in the closed position, a screwing rod 150 of one of the gripping heads 52a respectively faces a holding rod 152 of the second gripping head 52b.

The screws and nuts for fixing are respectively located in flanges 148a, 148b of the half-beacons. Each half-beacon has two first flanges for fixing to the cable arranged in diametrically opposite manner and, in the case of the embodiment described, two supplementary flanges also arranged in diametrically opposite manner and at 90° from the first flanges in the assembly plane. The flanges respectively correspond to the screwing assemblies and each flange of each half-beacon respectively has a screw and a nut corresponding respectively to the screwing rod and the holding rod of each screwing assembly.

Figure 6:
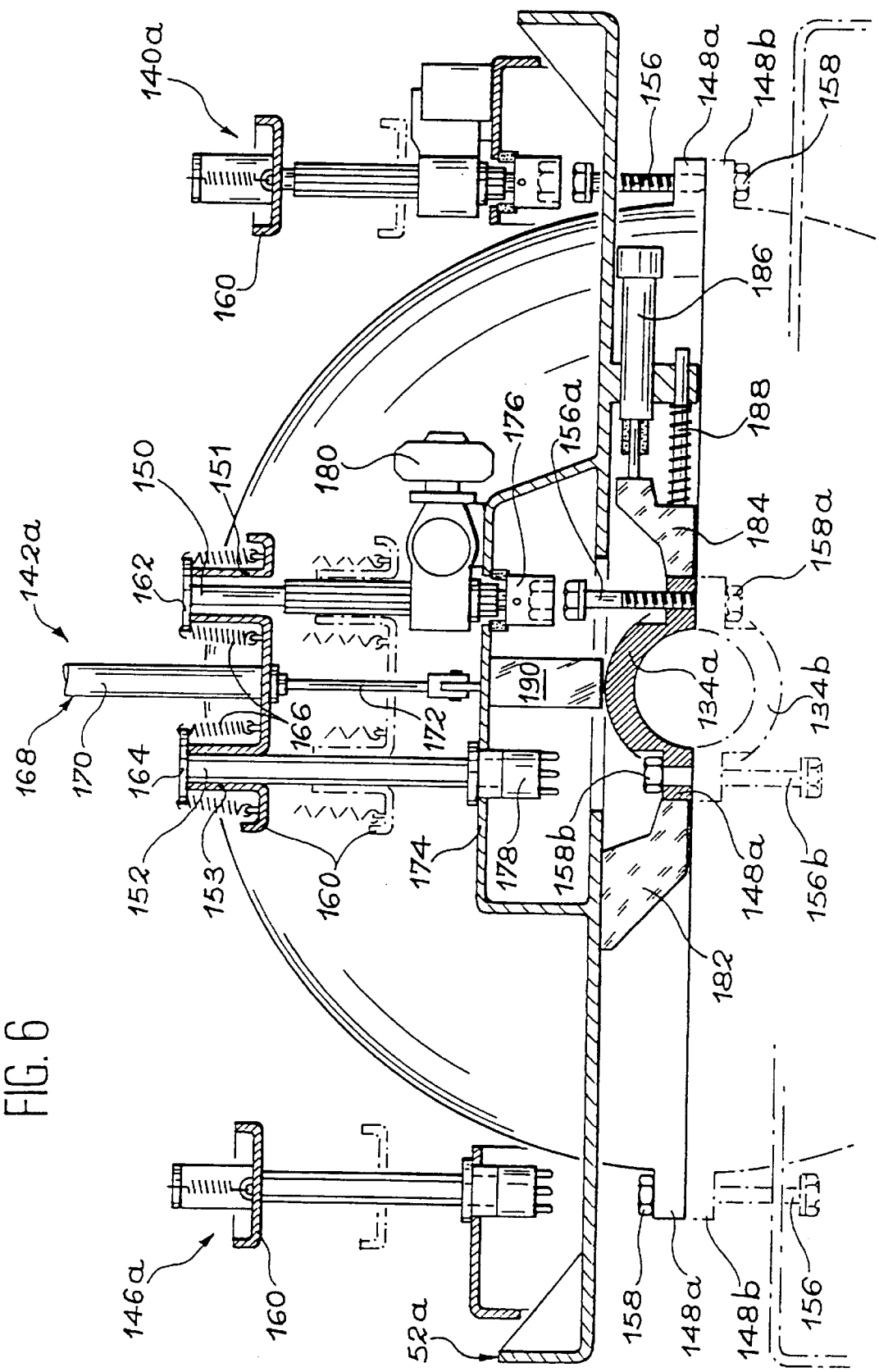
FIG. 6 is a detailed view of a half-beacon gripping head according to the invention.

FIG. 6 shows in greater detail a gripping head and provides a better understanding of the assembly of the half-beacons and the operation of the gripping heads.

The half-beacon 14a shown in FIG. 6 has four assembly flanges 148a, which are in the form of diametrically opposite pairs. Two of the assembly flanges also have a cable duct 134a. Corresponding assembly flanges 148b and a corresponding cable duct 134b are provided on the half-beacon 14b associated with the half-beacon 14a.

For ease of assembly reasons, the screws and nuts are already present on the beacons in the distribution magazines and are maintained there, e.g. by an adhesive paste.

In FIG. 6, references 156a, 156b, 158a, 158b respectively designates the screws and nuts of each half-beacon, respectively on either side of the cable duct 134a, 134b. References 156 and 158 designate the screws and nuts of each beacon on a lateral assembly flange 148a, 148b.

The operation of the screwing assemblies is explained with reference to the screwing assembly 142a in the centre of the drawing, but the operation of the other screwing assemblies is identical.

The screwing assembly has a mobile cup 160, which receives the screwing 150 and holding 152 rods. The cup has two sliding passages 151, 153 for the rods 150 and 152 and plates 162, 164 respectively integral with the rods 150, 152 connected to the cup by means of springs 166.

In a neutral state of the screwing assembly, the cup is in the high position, as shown in continuous line form in FIG. 6, whilst the plates 162, 164 bear against the top portion of the passages 151, 153.

A jack 168, whose jack body 170 is fixed to the cup 160 and whose jack rod 172 is fixed to a frame 174 of the gripping head 52a, makes it possible to lower the cup from its neutral position to a screwing position. The screwing position is shown in mixed line form in FIG. 6.

In the screwing position the screwing 176 and holding 178 heads of the rods 150 and 152 respectively engage with the screw 156a and the nut 158b. The plates 162, 164 are then separated from the passages 151, 153 and the springs 166 applied to the rods 150, 152 forces for firmly maintaining the screwing 176 and holding 178 heads on the screw 156a and nut 158b.

A ratchet-equipped hydraulic jack 180 is provided on each screwing rod for rotating the screwing head when the latter is applied to the corresponding screw 156 for carrying out screwing.

The jack 180 and jacks 168 are also controlled by the central control unit in order to be successively actuated when the gripping heads are in the closed position on the cable.

During the screwing of screw 156a, the nut 158a is held by the not shown holding rod, similar to the holding rod 152. In the same way, the holding rod 152 holds the nut 158b whilst a screwing rod drives the screw 156b.

FIG. 6 also shows the operation of a half-beacon gripping system. Each gripping head has two half-beacons gripping systems respectively cooperating with flanges 148a having a cable duct 134a.

Each gripping system has a first fixed jaw 182 integral with the frame 174 and a second mobile jaw 184. A jack 186 controlled by the central control unit moves the jaw 184 between a gripping position in which it is applied to the flange 148a and a not shown, release position, where the half-beacon is freed.

A helical spring 188 maintains the jaw 184 in the gripping position in the case of a failure of the jack 186.

Finally, an abutment 190, integral with the frame 174, is provided for facilitating the positioning of the flange 148a, having the cable duct 134a between the jaws 182, 184 of each gripping system.

I claim:

1. A device for automatically installing aerial beacons on a cable, comprising:
    a frame;
    attachment means for suspending the frame from a cable;
    movement means attached to said frame for moving the frame along the cable, wherein the movement means comprises a motor equipped with drive rollers that engage the cable, such that actuation of the motor causes rotation of said drive rollers whereby the frame is caused to travel along the cable in a movement direction;
    at least one pair of distribution magazines attached to the frame for holding and distributing half-beacons having respective assembly sides to be mated; and
    means attached to said frame for assembling a half-beacon distributed by one of said magazines to a half-beacon distributed by another of said magazines, while simultaneously assembling these half-beacons to the cable;

wherein said means for assembling is located at an end of said frame, such that said half-beacons are assembled to one another and to the cable at a location that is downstream of said attachment means relative to the movement direction.

2. The device according to claim 1, characterized in that the means for assembling the half-beacons have a guide for positioning the half-beacons relative to the cable prior to their assembly.

3. The device according to claim 2, characterized in that the means for assembling the half-beacons comprise:

at least one installation mechanism incorporating the positioning guide and a pair of gripping heads for gripping the half-beacons distributed by the distribution magazines and mutual articulation means for the gripping heads for pivoting the gripping heads about a first pivot axis from an open position of gripping the half-beacons to a closed position of assembling the half-beacons on the cable, in which the assembly sides respectively of each half-beacons are mutually in contact, and at least one movement mechanism for moving the installation mechanism between the magazines and the cable, the installation mechanism being pivotable on the movement mechanism about a second pivot axis in order to orient the positioning guide towards the cable.

4. The device according to claim 3, characterized in that at least one of the gripping heads has means for manipulating fixing members carried by the half-beacons.

5. The device according to claim 4, characterized in that the fixing members are screw-nut assemblies.

6. The device according to claim 3, characterized in that the positioning guide has a pair of forks in a plane substantially perpendicular to said second pivot axis and containing said first pivot axis.

7. The device according to claim 6, characterized in that the forks are arranged symmetrically on either side of the gripping heads.

8. The device according to claim 3, characterized in that each of the gripping heads has at least one gripping system cooperating with a flange of the half-beacons.

9. The device according to claim 3, characterized in that said attachment means includes at least two hooks respectively fixed at front and rear parts of the frame, and the distribution magazines are juxtaposed on the frame substantially parallel to said movement direction, each of the distribution magazines having a half-beacon distribution opening oriented towards the rear of the device with respect to the movement direction.

10. The device according to claim 9, characterized in that the movement mechanism has at least one pivoting arm with a first end having a first joint connected to the frame, the first joint having a pivot pin substantially perpendicular to a median plane of the half-beacon distribution magazines, and containing said movement axis, the movement mechanism also having a jack mounted between the frame and the pivoting arm for pivoting the arm about the pivot pin between a low position in which the installation mechanism is positioned behind the magazine distribution openings with respect to the movement direction and a high position in which the installation mechanism is positioned behind the suspension hooks with respect to the movement direction.

11. The device according to claim 10, characterized in that the pivoting arm has a second end with a second joint along a pivot pin substantially parallel to the pivot pin of the first joint, the second joint carrying the installation mechanism, the device having actuating means for pivoting the installation mechanism about the pivot pin of the second joint between a first position in which the gripping heads are in the open position and turned toward the distribution openings of the magazines, when the movement arm is in the low position, and a second position in which the gripping heads are turned facing the cable, when the movement arm is in the high position.

12. The device according to claim 11, characterized in that the device has a central control unit connected to control, from a neutral position, the means for assembling the half-beacons, in which the pivoting arm is in the low position and the installation mechanism is in the first position, wherein the control unit successively:

causes actuation of a gripping system of each gripping head in order to seize a half-beacon in each magazine, causes actuation of the jack of the pivoting arm and actuating means for pivoting the arm towards the high position and for pivoting the installation mechanism to the second position, causes actuation of the installation mechanism for pivoting the gripping heads from the open position to the closed position, causes actuation of the means for manipulating the fixing members for the beacons, causes actuation of the gripping system of each gripping head for releasing the half-beacons, causes actuation of the installation mechanism for pivoting the gripping heads from the closed position to the open position, and p1 causes actuation of the jack of the pivoting arm and actuating means for respectively pivoting the arm to the low position and for pivoting the installation mechanism to the first position.

13. A device for automatically installing aerial beacons on a cable, comprising:

a frame;

attachment means for suspending the frame from a cable;

movement means attached to said frame for moving the frame along the cable in a movement direction;

at least one pair of distribution magazines attached to the frame for holding and distributing half-beacons having respective assembly sides to be mated; and means attached to said frame for assembling a half-beacon distributed by one of said magazines to a half-beacon distributed by another of said magazines, while simultaneously assembling these half-beacons to the cable;

wherein said means for assembling is located at an end of said frame, such that said half-beacons are assembled to one another and to the cable at a location which is downstream of said attachment means relative to the movement direction, and said means for assembling comprise:

at least one installation mechanism incorporating a positioning guide and a pair of gripping heads for positioning said half-beacons relative to said cable prior to their assembly, and mutual articulation means for said gripping heads for pivoting the gripping heads about a first pivot axis from an open position of gripping said half-beacons to a closed position of assembling said half beacons on said cable, in which said assembly sides respectively of each half-beacon are mutually in contact, and at least one movement mechanism for moving said installation mechanism between said magazines and said cable, said installation mechanism being pivotable on the movement mechanism about a second pivot axis in order to orient said positioning guide towards said cable.

14. The device according to claim 13, characterized in that at least one of the gripping heads has means for manipulating fixing members carried by the half-beacons.

15. The device according to claim 13, characterized in that the positioning guide has a pair of forks in a plane substantially perpendicular to said second pivot axis and containing said first pivot axis.

16. The device according to claim 13, characterized in that each of the gripping heads has at least one gripping system cooperating with a flange of the half-beacons.

17. The device according to claim 13, characterized in that said attachment means includes at least two hooks respectively fixed at front and rear parts of the frame, and the distribution magazines are juxtaposed on the frame substantially parallel to said movement direction, each of the distribution magazines having a half-beacon distribution opening oriented towards the rear of the device with respect to the movement direction.

18. The device according to claim 17, characterized in that the movement mechanism has at least one pivoting arm with a first end having a first joint connected to the frame, the first joint having a pivot pin substantially perpendicular to a median plane of the half-beacon distribution magazines, and containing said movement axis, the movement mechanism also having a jack mounted between the frame and the pivoting arm for pivoting the arm about the pivot pin between a low position in which the installation mechanism is positioned behind the magazine distribution openings with respect to the movement direction and a high position in which the installation mechanism is positioned behind the suspension hooks with respect to the movement direction.

19. The device according to claim 18, characterized in that the pivoting arm has a second end with a second joint along a pivot pin substantially parallel to the pivot pin of the first joint, the second joint carrying the installation mechanism, the device having actuating means for pivoting the installation mechanism about the pivot pin of the second joint between a first position in which the gripping heads are in the open position and turned toward the distribution openings of the magazines, when the movement arm is in the low position, and a second position in which the gripping heads are turned facing the cable, when the movement arm is in the high position.

20. The device according to claim 19, characterized in that the device has a central control unit connected to control, from a neutral position, the means for assembling the half-beacons, in which the pivoting arm is in the low position and the installation mechanism is in the first position, wherein the control unit successively:

causes actuation of a gripping system of each gripping head in order to seize a half-beacon in each magazine, causes actuation of the jack of the pivoting arm and actuating means for pivoting the arm towards the high position and for pivoting the installation mechanism to the second position, causes actuation of the installation mechanism for pivoting the gripping heads from the open position to the closed position, causes actuation of the means for manipulating the fixing members for the beacons, causes actuation of the gripping system of each gripping head for releasing the half-beacons, causes actuation of the installation mechanism for pivoting the gripping heads from the closed position to the open position, and causes actuation of the jack of the pivoting arm and actuating means for respectively pivoting the arm to the low position and for pivoting the installation mechanism to the first position.

* * * * *

UNITED STATES PATENT AND TRADEMARK OFFICE
CERTIFICATE OF CORRECTION

PATENT NO. : 5,901,435
DATED : May 11, 1999
INVENTOR(S) : Vallee

It is certified that error appears in the above-identified patent and that said Letters Patent is hereby corrected as shown below:

On the Title Page, References Cited, U.S. PATENT DOCUMENTS, delete the following references:

```
"4,589,175    5/1986    Arrigoni        29/156.8B
 4,638,602    1/1987    Cavalieri       51/217R
 4,805,351    2/1989    Dobson et al.   51/217R
 4,829,720    5/1989    Cavalieri       51/217R
 5,230,183    7/1993    Wagner, Jr.     51/217R".
```

Column 10, Line 12, delete "52a" and insert --52a--.

Column 12, Line 33, Claim 12, delete "pl".

Signed and Sealed this

Thirtieth Day of November, 1999

Attest:

Attesting Officer

Q. TODD DICKINSON

Acting Commissioner of Patents and Trademarks